(No Model.)
J. L. McFARLIN.
PLANT TRANSPLANTER.
No. 496,745. Patented May 2, 1893.
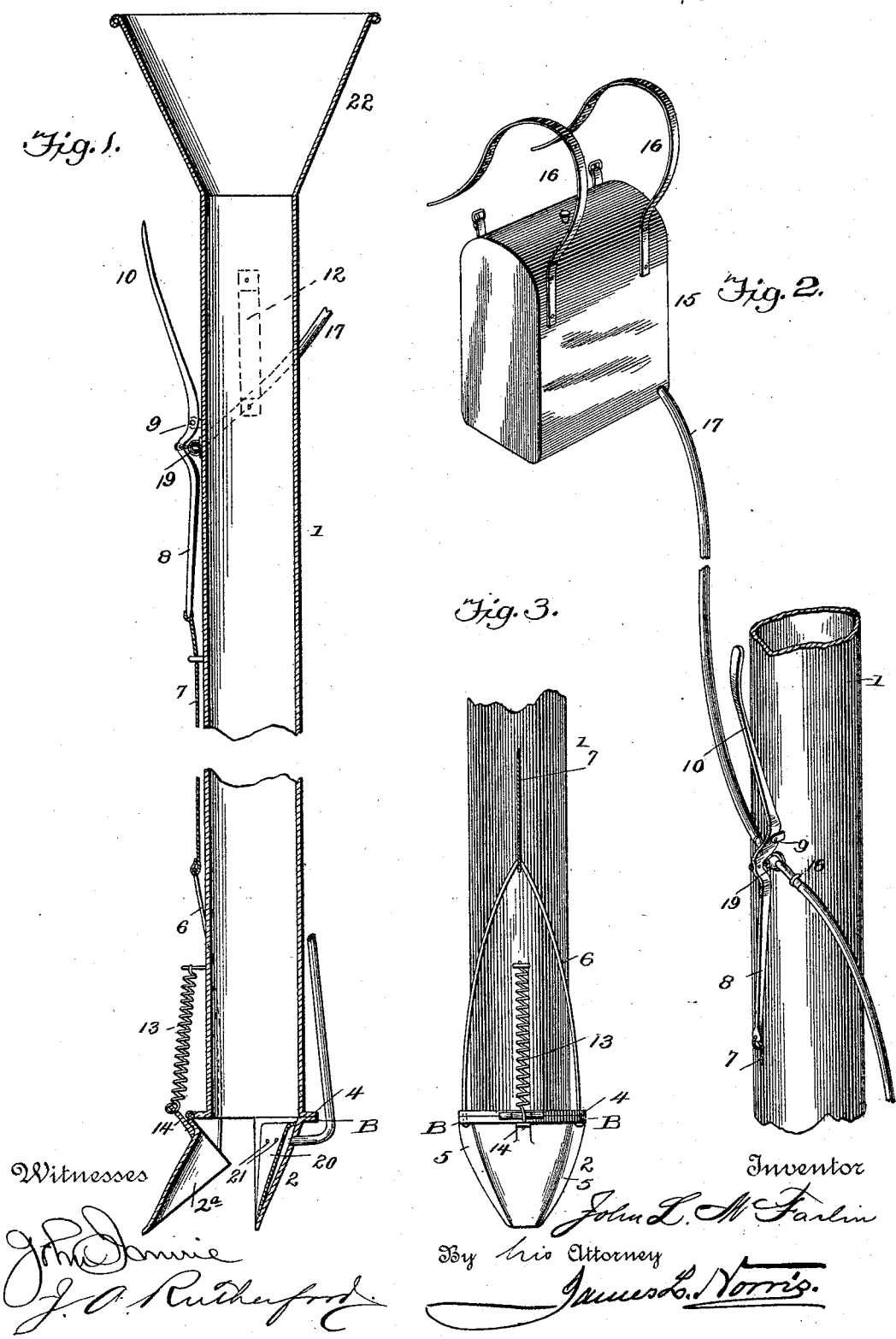

UNITED STATES PATENT OFFICE.

JOHN L. McFARLIN, OF QUINCY, FLORIDA.

PLANT-TRANSPLANTER.

SPECIFICATION forming part of Letters Patent No. 496,745, dated May 2, 1893.

Application filed May 3, 1892. Serial No. 431,653. (No model.)

*To all whom it may concern:*

Be it known that I, JOHN L. MCFARLIN, a citizen of the United States, residing at Quincy, in the county of Gadsden and State of Florida, have invented new and useful Improvements in Plant-Transplanters, of which the following is a specification.

My invention relates to implements for transplanting and fertilizing plants, the purpose thereof being to provide simple and comparatively inexpensive means whereby the plant is grasped and removed, together with the soil in the immediate neighborhood of its roots, deposited at any desired point, in suitable position, and showered with water, the entire operation being speedily and easily performed, without requiring the operator to stoop, the watering of the plant, simultaneously with its setting, causing a deposit of moist earth, closely packed around with dry earth, by which the moisture is retained for a considerable period.

It is a further purpose of my invention to make provision for the automatic operation of the water-sprinkling devices whereby the removal of the plant from the soil and the simultaneous compression of the earth upon the roots will produce a showering of the plant with water whereby the soil in which the roots are native and which is taken up with the plant is thoroughly moistened.

The invention consists in the several novel features of construction and new combinations of parts hereinafter fully set forth and then particularly pointed out and defined in the claims which conclude this specification.

To enable others to understand, to make, construct and use my said invention I will proceed to describe the same in detail, reference being had to the accompanying drawings, in which—

Figure 1 is a central longitudinal section of an implement constructed in accordance with my invention. Fig. 2 is a detail view, showing the automatic watering devices. Fig. 3 is a broken side elevation of the lower portion of the tubular or cylindrical casing.

The reference numeral 1 in said drawings indicates the body of the implement, which is preferably cylindrical and of such length that a person of ordinary stature can operate it from one end without stooping. At the open lower end of the body portion is rigidly attached a shell 2, having nearly the form of a cone which has been divided in the line of its axis. This half cone is usually provided with a flange B, which is riveted to a collar 4 upon the open end of the body portion 1. Upon said collar, at a point diametrically opposite the center of the half cone 2 is hinged the other half $2^a$ of said cone, its form being such that when brought together with the rigid part 2, the two will form a conical, or substantially conical point, or extremity, for the body of the implement. In practice, I prefer to form upon each half-cone, or half shell, a lip, or flange 5, lying substantially parallel with the diametrical, longitudinal plane of the device. When the two half cones are brought together, by swinging the hinged member 2 down upon the open end of the body portion 1, these flanges 5 will meet and lie in close contact, closing the end on which they are mounted.

To the lip, or flange, 5 upon each side of the hinge-joint, connecting the half cone to the body-portion, is attached a yoke composed of a wire or strong cord 6, which passes through an opening in the collar and extends along the outside of the body-portion 1 to a point where it unites with the other and similar wire which is connected to the flange 5 on the other side of the hinge-joint.

To the united wires 6 is connected a wire or cord 7, which extends along the outside of the body portion 1 and is secured to the end of a lever 8, having a fulcrum 9 which projects from the cylindrical body and a handle 10 which lies within easy reach of the operator, who manages the implement by means of a handle 12. The half cone $2^a$ is normally thrown open and held in that position by a spring 13, attached to an arm 14, projecting from the flange 2 and connected by its other end to a pin on the body portion 1.

The reference numeral 15 indicates a tank, or reservoir, of any suitable construction, provided with straps 16, or any preferred means whereby it may be swung upon the shoulder, or back, of the person using the transplanter. From an outlet in the lower part of the tank a pipe 17 is carried to the cylindrical body 1 where it is so arranged that a portion thereof will lie beneath the power end of the lever 8, where it may be supported by keepers 18, the purpose being to enable the said lever, when it is operated, to open a stop-valve 19 in the pipe 17, and hold the same open during the time the lever remains depressed. This stop-valve being thus opened, the water is allowed to flow through the pipe 17 while the lever 8 is operated, and is cut off when the lever is released. The end of the pipe enters the cylindrical casing 1 just above the point where the conical point pieces are attached.

Within the half-cone 2 is arranged a false back 20, extending upward some little distance above the point where the pipe 17 enters. This false back incloses a chamber into which the pipe discharges, the exit-opening from said chamber being at the point 21.

In using the implement the plant with soil adhering, is dropped, roots downward, into the funnel at the top. The cone-shaped point, the hinged part thereof being closed, is then driven, or forced into the earth at the place where the plant is to be set. The plant, inserted through the funnel mouth 22, and dropped to the lower end of the cylindrical casing, is held by the conical point, which remains closed until the point is struck into the earth. The lever 8 is then released and the spring opens the point, allowing the withdrawal of the same, which allows the dry soil to fall back into the hole made, and cover the soil adhering to the roots, at the same time drenching the latter and the soil with water. If the soil is damp where the plant is set, I usually close the indentation made by the point by compression with the toe of the boot.

What I claim is—

1. In a transplanting implement, the combination with a casing, or body, having a suitable transplanting point, of a fluid reservoir, or tank, containing fluid, a pipe connecting the same with the interior of the casing, and a lever fulcrumed on the latter and having its end over a portion of the pipe, to permit the discharge of fluid, substantially as described.

2. The combination with a tubular casing, of a transplanting point composed of two half cones, one rigid and the other hinged to the lower end of the tubular casing and provided with a projecting arm 14, a spring 13 connecting said arm with the casing, a yoke 6 connected with the hinged half cone, the wire or cord 7 extending along the casing, and a pivoted lever 8 connected with the wire or cord, substantially as described.

3. The combination with a casing having a transplanting point one part of which is movable, of a lever connected thereto, a fluid reservoir, a pipe connecting said reservoir with a chamber in the point of the casing having an exit opening and means for opening said pipe when the movable point is operated, substantially as described.

4. The combination with a casing having a point composed of a rigid and a hinged spring-retracted half-cone, of a fluid reservoir, a pipe connecting the same with a chamber formed by a false back, or diaphragm, in the rigid half cone, a lever fulcrumed on the casing and connected to the hinged half cone, said lever being adapted to operate a stop-valve in the pipe, substantially as described.

In testimony whereof I have hereunto set my hand and affixed my seal in presence of two subscribing witnesses.

JOHN L. McFARLIN. [L. S.]

Witnesses:
 GEO. D. MUNROE,
 MARK W. MUNROE.